United States Patent
Bottorff

(10) Patent No.: US 9,148,403 B2
(45) Date of Patent: Sep. 29, 2015

(54) METHOD FOR AGGREGATING MEDIA ACCESS CONTROL ADDRESSES USING A SUMMARY MEDIA ACCESS CONTROL ADDRESS(ES)

(76) Inventor: Paul Allen Bottorff, Portola Valley, CA (US)

(*) Notice: Subject to any disclaimer, the term of this patent is extended or adjusted under 35 U.S.C. 154(b) by 293 days.

(21) Appl. No.: 13/010,787

(22) Filed: Jan. 21, 2011

(65) Prior Publication Data

US 2012/0188990 A1 Jul. 26, 2012

Related U.S. Application Data

(60) Provisional application No. 61/336,461, filed on Jan. 22, 2010.

(51) Int. Cl.
*H04W 84/02* (2009.01)
*H04L 29/12* (2006.01)

(52) U.S. Cl.
CPC ........ *H04L 61/2596* (2013.01); *H04L 61/6022* (2013.01)

(58) Field of Classification Search
USPC .......................................... 370/338
See application file for complete search history.

(56) References Cited

U.S. PATENT DOCUMENTS

| | | | | |
|---|---|---|---|---|
| 5,535,338 A * | 7/1996 | Krause et al. | ................. | 709/222 |
| 7,724,745 B1 * | 5/2010 | Elangovan et al. | ........... | 370/392 |
| 7,889,681 B2 * | 2/2011 | Finn | .............................. | 370/256 |
| 2008/0080496 A1 * | 4/2008 | Slaight | .......................... | 370/389 |
| 2011/0292939 A1 * | 12/2011 | Subramaian et al. | ......... | 370/392 |

* cited by examiner

*Primary Examiner* — Sulaiman Nooristany

(57) ABSTRACT

In frame switched communication networks, information is forwarded from a source to a destination based on a destination address. In IEEE 802 networks these addresses are called Media Access Control (MAC) addresses. MAC addresses identify the source and destination station of each frame, however typically don't contain any subfields which identify the physical or logical location (or subnetwork) of the station. Such an address can be called a flat address. The entities of networks using IEEE 802 MAC addresses don't have methods for aggregating MAC addresses or for forwarding frames based on aggregates rather than station MAC addresses. The use of station MAC addresses for frame forwarding limits the scaling, lowers the efficiency, reduces the security and raises the cost of these networks. The method described here solves the MAC address aggregation problem by using a summary MAC address to represent an aggregate of summarized MAC addresses.

3 Claims, 7 Drawing Sheets

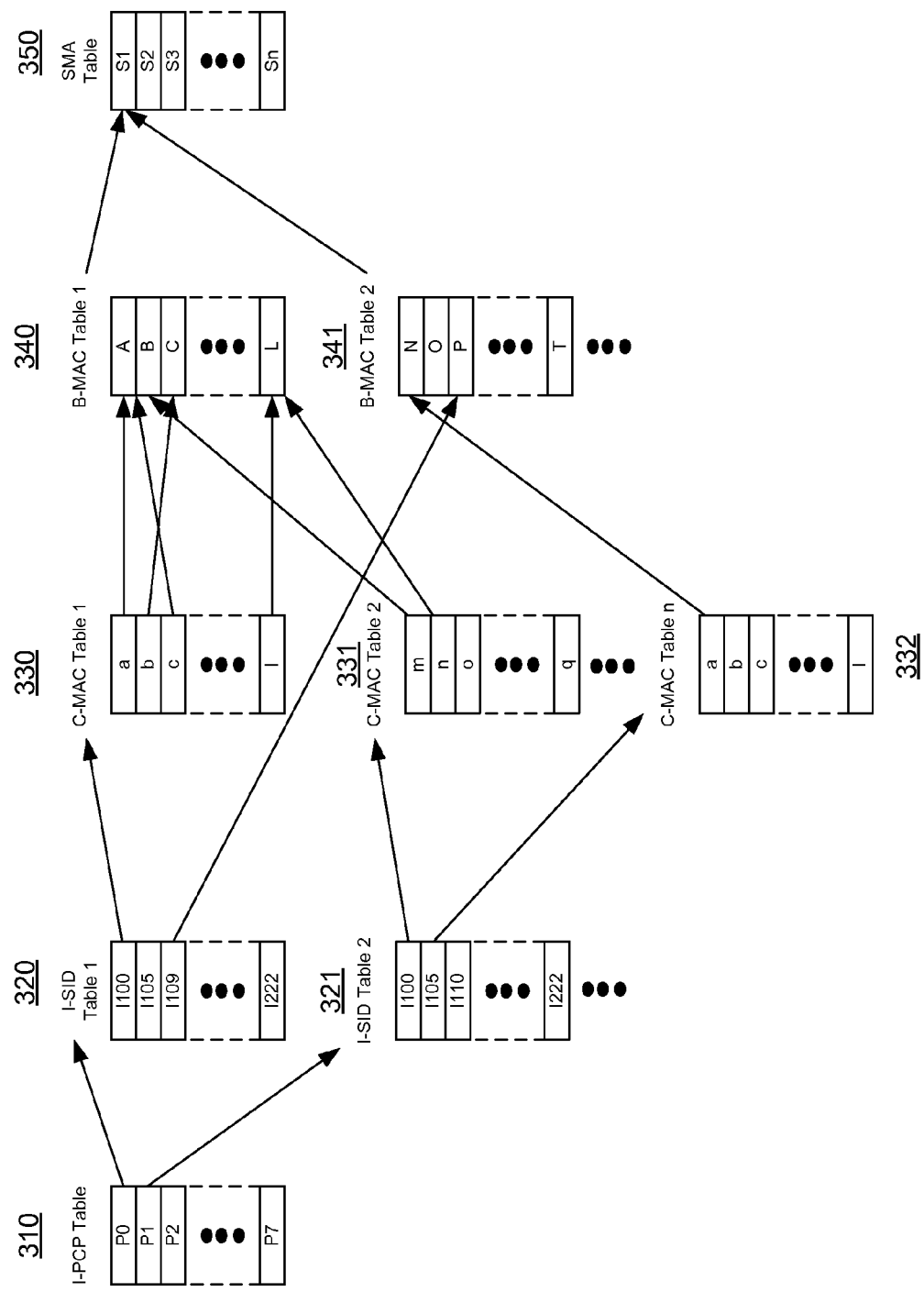

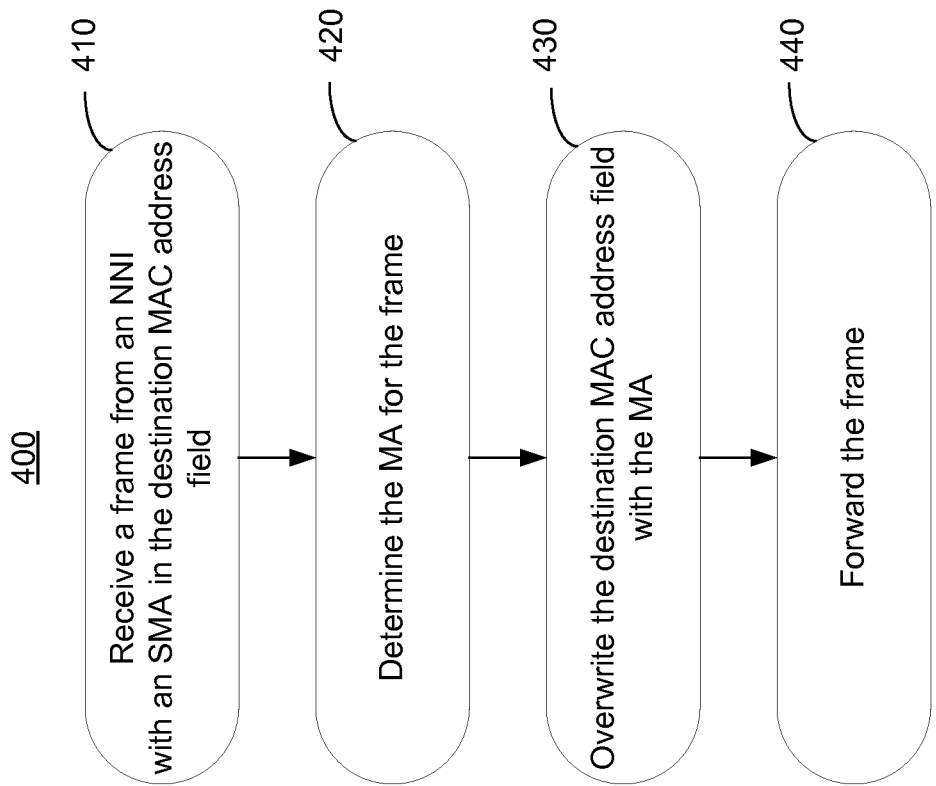

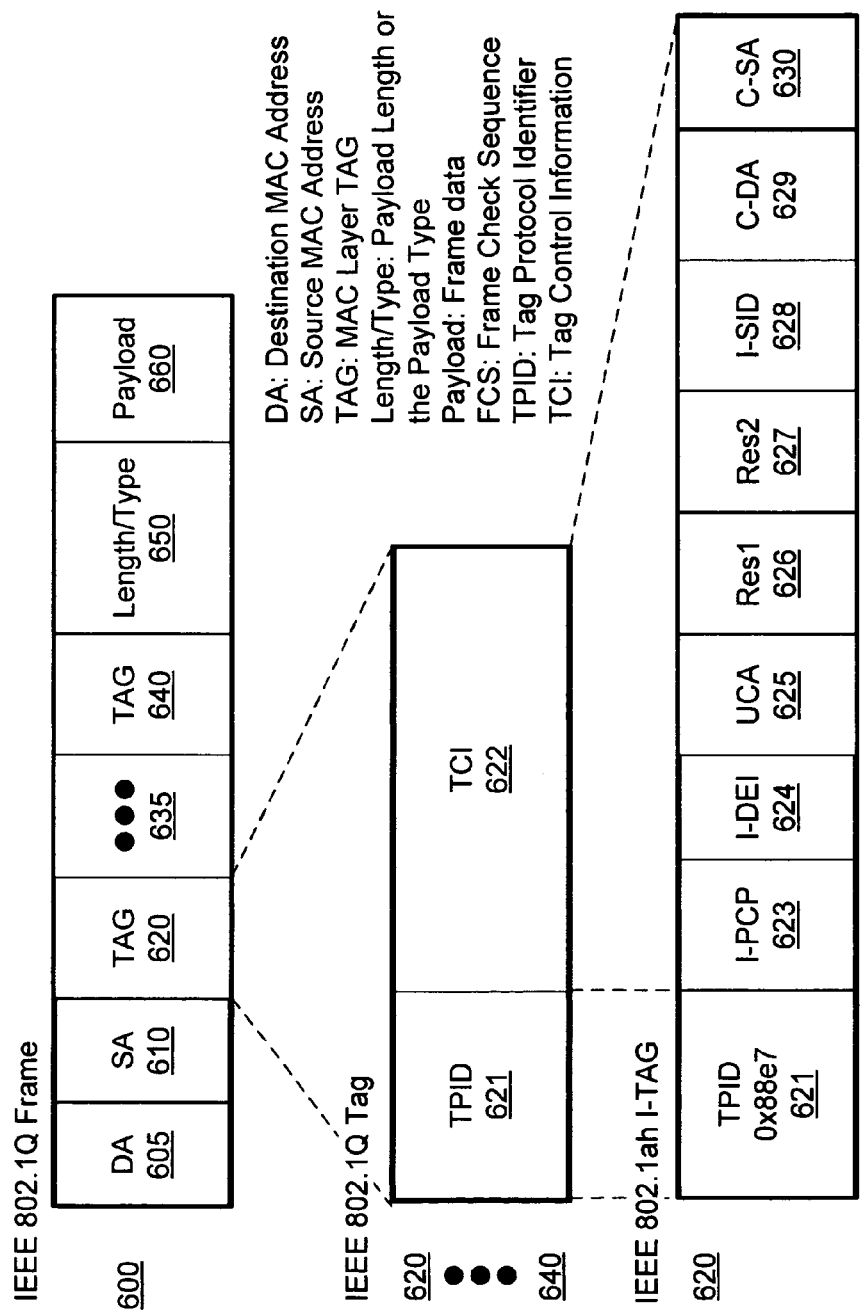

METHOD FOR AGGREGATING MEDIA ACCESS CONTROL ADDRESSES USING A SUMMARY MEDIA ACCESS CONTROL ADDRESS(ES)

CROSS-REFERENCE TO RELATED APPLICATIONS

This application claims the benefit of the filing date of U.S. Provisional Patent Application No. 61/336,461, filed Jan. 22, 2010 titled "Method for aggregating media access control addresses using a summary media access control address(es)" which is hereby incorporated by reference for all purposes.

BACKGROUND OF INVENTION

In frame switched communication networks, information is forwarded from a source to a destination based in whole or part on a destination address. In Bridged Ethernet communication networks these addresses are called Media Access Control (MAC) addresses. MAC addresses identify the source and destination station (end or intermediate, individual or group) of each frame, however typically don't contain any subfields which identify the physical or logical location (or subnetworks) of the station. Such an address can be called a flat address.

Recent advances in Bridged Ethernet frame switched communication networks have eliminated the limitations of both geographic size and number of supported nodes. Specifically, Provider Backbone Bridging (IEEE 802.1ah) along with the supporting control plane (IEEE draft 802.1aq) allows a single Bridged Ethernet to span any distance and to support as many nodes as can be addressed by MAC addresses.

Within a very large Bridged Ethernet each Bridge must hold a table of most of the MAC addresses forwarded by that Bridge. Since the size of these MAC address tables grows in proportion to the number of Ethernet MAC addresses passing through each Bridge these tables constrain the practical network size.

Further, Ethernet Bridges don't have methods for aggregating MAC addresses or for forwarding frames based on aggregates rather than the individual or group station MAC addresses. The use of non-aggregated flat individual or group station MAC addresses for frame forwarding limits the scaling, lowers the efficiency, reduces the security and raises the cost of these networks.

BRIEF SUMMARY OF THE INVENTION

Currently no address aggregation methods are used in Bridge Ethernet networks. The method described provides a practical address aggregation method for IEEE 802 networks. The summary MAC method described here for IEEE 802 networks does not rely on the structure of a MAC address to allow aggregation. Instead the method described here uses a table transform to summarize a list of "flat" network address. The method here could be applied to any network with a "flat" address space. In addition, the method specified here differs from encapsulation methods which add additional MAC addresses to the frame with an encapsulation layer. The method described swaps the station MAC addresses (MA) carried in the frame Source (SA) and Destination (DA) fields for a summary MAC (SMA) address and vice-versa, over-writing the original SA and DA fields. The SMA is derived by decoding the layer 2 tag fields such as the Backbone Service Instance tag (I-TAG) which is specified in IEEE Std 802.1ah-2008.

BRIEF DESCRIPTION OF THE DRAWINGS

FIG. 3 illustrates an example MAC address aggregation database.

FIG. 4 is a flowchart illustrating example operations which may be implemented for MAC address aggregation.

FIG. 6 is a data frame which may be utilized in an embodiment of the invention

DETAILED DESCRIPTION OF THE INVENTION

The present invention relates to a method for aggregating media access control addresses using a summary media access control address(es).

The system is comprised of the following elements:
Summary MAC Address(es) (SMA) representing aggregate(s) of summarized station MAC addresses
Summary Source MAC Address Frame Processing Entity (SSAFPE)
Summary Destination MAC Address Frame Processing Entity (SDAFPE)

Summary MAC Addresses (SMAs) are ordinary MAC Addresses (MAs) except for their use. SMAs are addresses taken from the MAC address space for use as SMAs within a particular network. Each SMA is used to represent an aggregate of MAs. The individual MAs of the aggregate are called summarized MAC addresses. It is possible that a summarized MAC address is also a SMA. In other words a Summary MAC Address represents a list (or set) of Summarized MAC Addresses which can be aggregated for frame forwarding or security purposes. SMAs may be used both as source MAC addresses (SA) and as a destination MAC addresses (DA). Frames containing an SMA SA or SMA DA are processed in the same manner as frames with a conventional SA and DA except by network entities with specific SMA processing capabilities such as the SDAFPE and SSAFPE.

The SSAFPE is a network entity which performs transformation from MAs to SMA(s). The SSAFPE inputs frames containing MA SAs and outputs frames containing SMA SAs.

The SDAFPE is a network entity which performs transformation from SMA(s) to MAs. The SDAFPE inputs frames containing SMA DAs and outputs frames containing MA DAs.

An SMA is the address resolved by an SSAFPE instance to use in place of a MA which is part of an aggregate of MAC addresses (which can include both station and summary MAC addresses) identified by the SMA. The SSAFPE replaces MAs carried in a frame's SA field with SMAs.

An MA is the address resolved by an SDAFPE instance to use in place of a SMA by inspection of the frames content. The SDAFPE replaces SMAs carried in a frame's DA field with MAs.

The SSAFPE and SDAFPE work together to advertise SMAs and to map between SMAs and summarized MAs.

Figure 1:
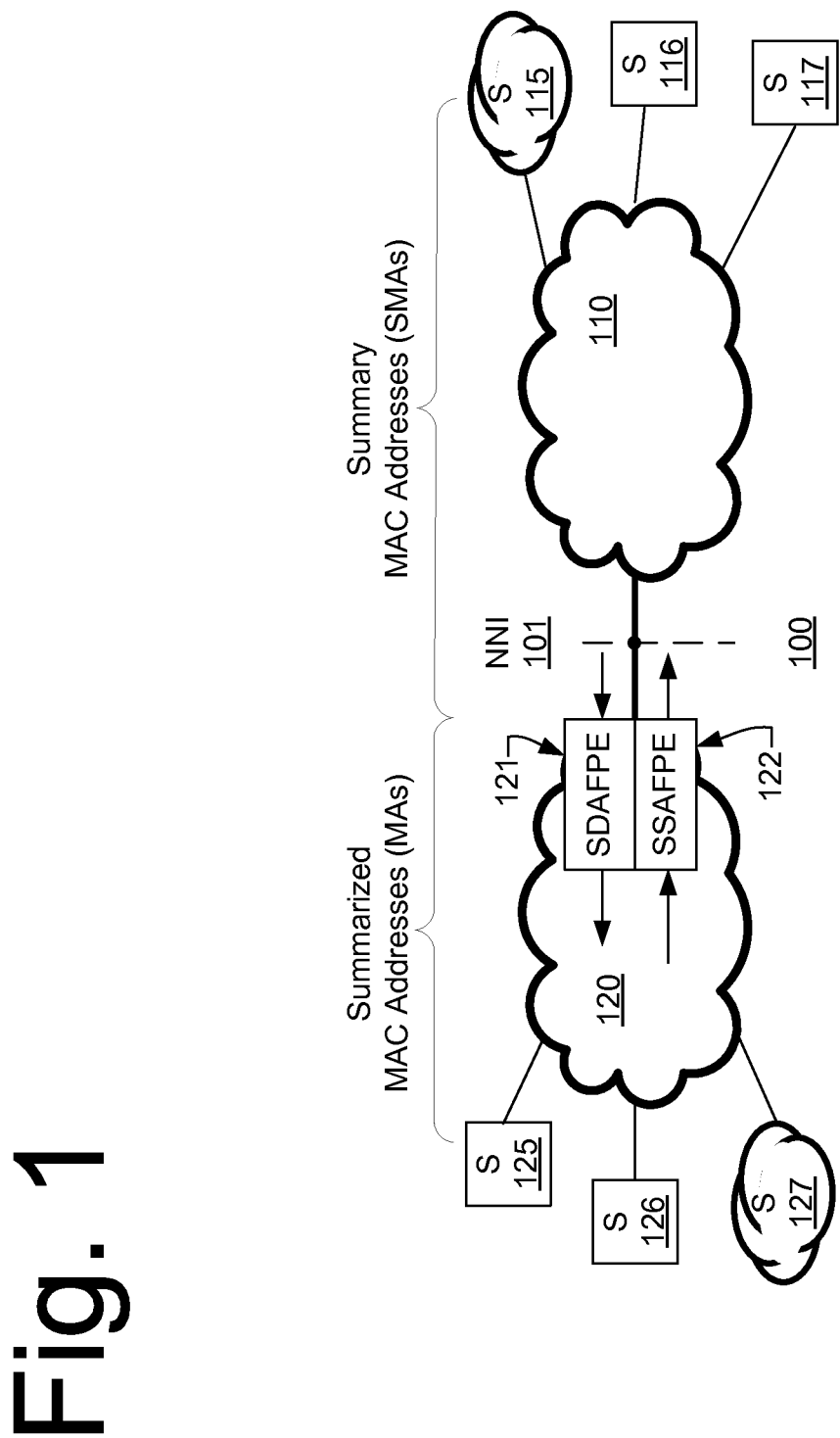
FIG. 1 is a high-level illustration of an example network implementing MAC address aggregation over a Network to Network Interface (NNI) between two Bridged Ethernet networks.
Figure 2:
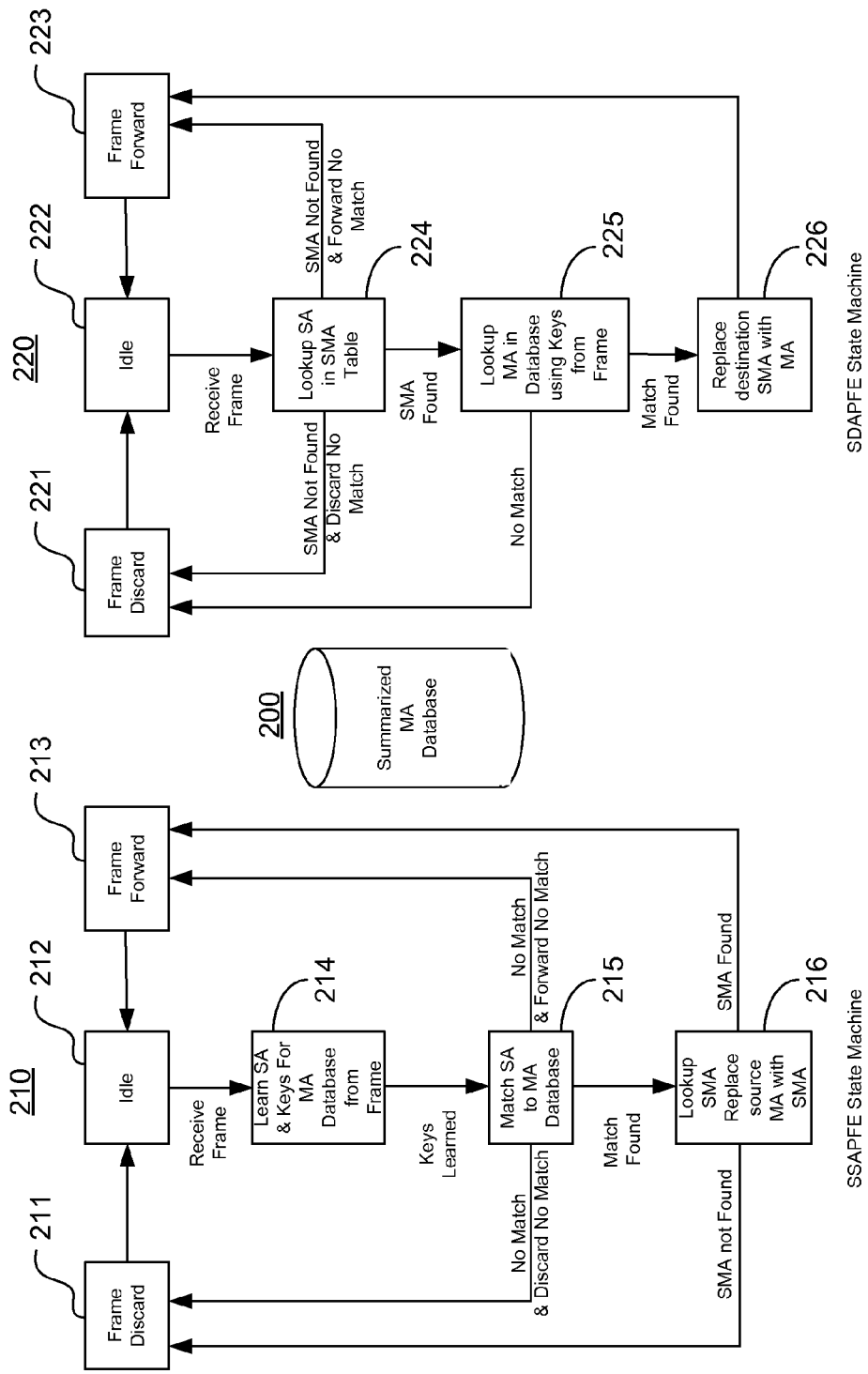
FIG. 2 is a state diagram illustrating MAC address aggregation.

FIG. 1 shows a pair of SDAFPE and SSAFPE instances on one side of a Network to Network Interface (101) between network regions 120 and 110. The addresses used in 120 are station MAC Addresses (MAs) which are summarized by Summary MAC Address (SMA) exchanged in the Source Address (SA) of frames sent from 120 to 110 and exchanged in the Destination Address (DA) of frames sent from 110 to 120.

Frames with MAC addresses being aggregated have their SA replaced by an SMA representing an aggregate of summarized MAC addresses as they pass through an SSAFPE. The network elements which receive frames with SMAs learn, discover or are programmed with these aggregate addresses in just the same way as they process normal MAs. SMAs are indistinguishable from MAs except by the SSAFPE and SDAFPE instances. The network elements therefore use the SMAs as if they were MAs. In particular, when a frame is sent by a network element it may use an SMA DA. Frames using SMA DAs are indistinguishable from frames with MA DAs except by the SDAFPE instances. When a frame with an SMA DA passes through an SDAFPE instance the SDAFPE instance replaces the SMA with a summarized MA resolved by the SDAFPE instance through inspection of the frame content. What this does is allow sections of the network to learn and forward based on SMAs rather than MAs. Since the SMAs represent an aggregate the forwarding process now makes decisions on an aggregate MA basis. In addition, the summarized MAs are hidden from network elements which only see SMAs.

Within a network special SMA processing entities instances perform transformations from SMAs to MAs and from MAs to SMAs. These entities are the Summary Source MAC Address Frame Processing Entity (SSAFPE) and the Summary Destination MAC Address Frame Processing Entity (SDAFPE). The function of the SSAFPE is to replaces the MA SAs of frames passing through it with SMA SAs while the function of the SDAFPE is to replaces the SMA DAs of frames passing through it with MA DAs.

A frame containing a SMA DA is forwarded by the network like a frame with an ordinary MA DA until the frame passes through an SDAFPE which recognizes the SMA. When a SDAFPE finds a frame with a recognized SMA it transforms the SMA DA of the frame into a MA DA. The MA is determined by the SDAFPE from the summarized MAC addresses of the aggregate represented by the summary MAC address. Many algorithms could be used by the SDAFPE to perform the transformation from MSASMA to MA. The example below provides one possible embodiment, however the specific algorithm for this transformation is not essential to the invention.

When a frame passes through an SSAFPE, the SSAFPE determines if it is aggregating the frame's source MAC address. If the SSAFPE is aggregating the SA the SSAFPE replaces the MA of the frame SA with an SMA. A frame containing a Summary Source MAC Address (SSA) is forwarded like any ordinary frames which containing a station Source MAC Address (SA) by the other network entities. Many algorithms could perform the transformation from SA to SDA. The example below provides on possible embodiment, however the specific algorithm for this transformation is not essential to the invention.

Figure 5A:
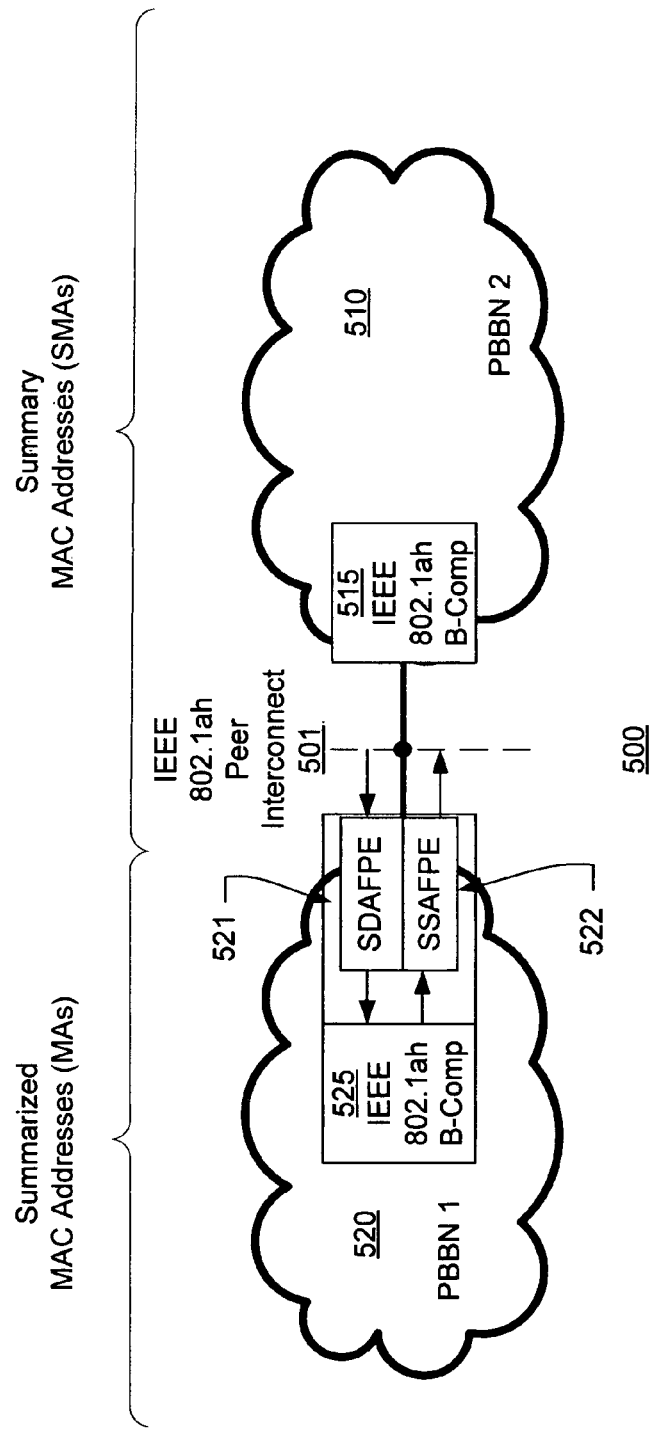
FIGS. 5A and 5B illustrate and embodiment of a network implementing MAC address aggregation over an IEEE Std 802.1ah-2008 peer interconnect.
Figure 5B:
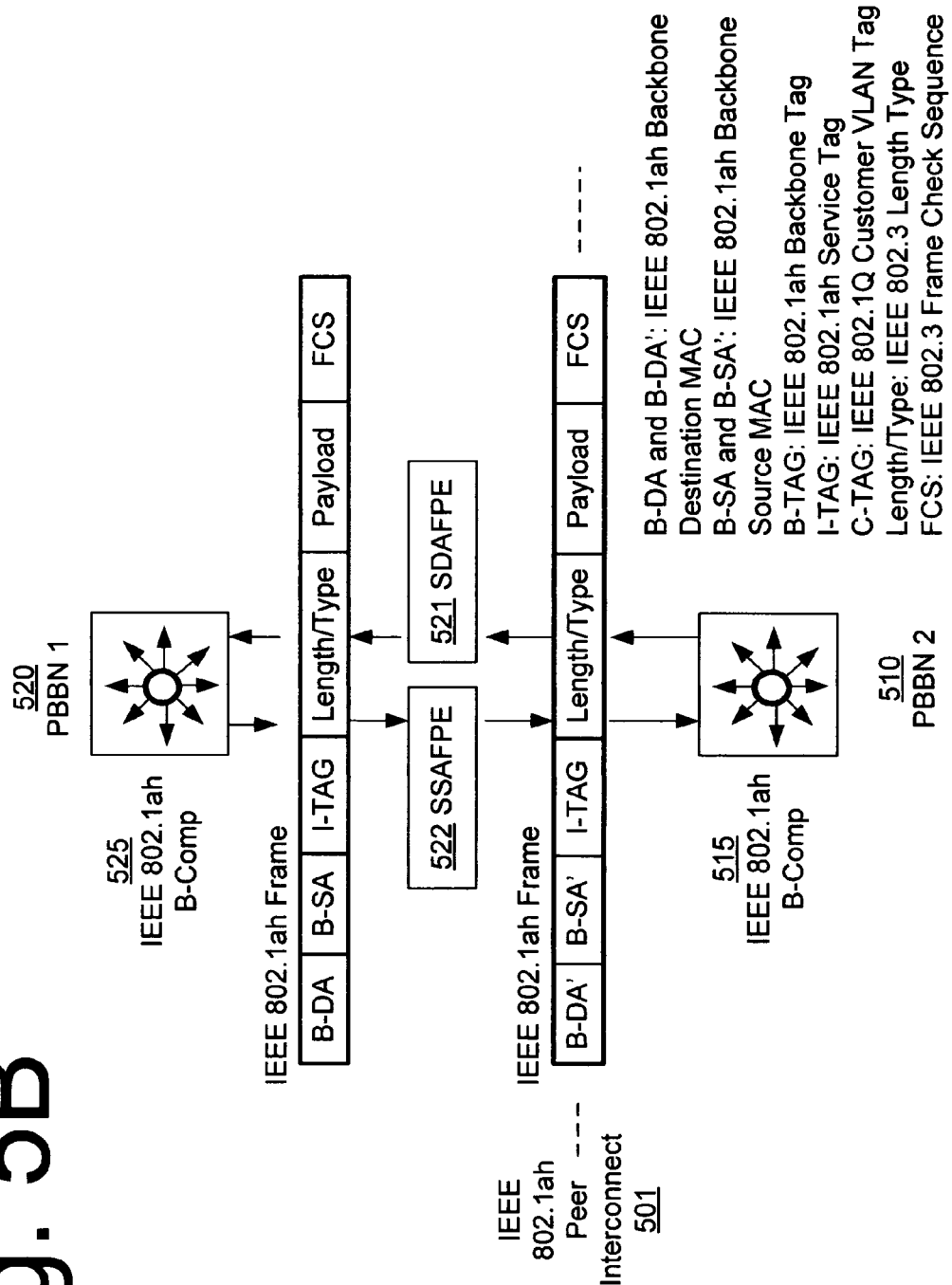

An example of the use of this method is as an optional enhancement to the peer interconnect between Provider Backbone Bridged Networks (PBBNs) which is a particular type of NNI standardized in IEEE Std 802.1ah-2008 subclause 26.6.2 (see FIG. 5). In this NNI 802.1ah B-MAC addresses are exchanged over the NNI reference point (501) between B-Components 525 and 515. A SSAFPE and SDAFPE pair may be inserted in either or both B-Components on each network side of the NNI point. An SSAFPE (522) learns all the addresses within its PBBN1 (520) and uses one or many summary MAC addresses to represent these over the NNI to the other B-Component (515) in the other PBBN2 (510). In this way PBBN2 learns summary MAC addresses which are delivered in the Source MAC Address field of frames over the NNI reference point. The SDAFPE (521) in PBBN1 on receipt of a frame with a recognized DA as a SMA transforms the SMA using information contained in the frame and in its internal summarized MA tables to a MA for PBBN1. In this way PBBN2 sees SMAs from PBBN1 and makes all forwarding decisions for frames destine to PBBN1 based on SMAs.

Many algorithms are possible for performing the MA SA to SMA SA and SMA DA to MA DA transformation of the SSAFPE and SDAFPE. The specific algorithm used by the SSAFPE and SDAFPE to perform MA to SMA and SMA to MA transforms is not essential to the invention. In one embodiment a SSAFPE and SDAFPE pair uses shared tables of summarized MACs. In another embodiment separate tables are used by the SSAFPE and SDAFPE. These tables may be constructed in many ways, for instance by provisioning, static configuration, learning, network discovery, link state exchange protocols, etc.

In one embodiment the summarized MAC address tables used by SSAFPE and SDAFPE are each associated with, and indexed from, summary MAC address(es) tables. From any summarized MAC address it is possible to find a summary MAC address and from any summary MAC address it is possible to find the list of summarized MAC addresses. In one embodiment the relationship between summary MAC addresses to summarized MAC addresses is 1-n in another embodiment the relationship may be n-m. In one embodiment the summarized MAC tables are indexed by tables containing information within the frames processed by the SSAFPE and SDAFPE. This information may be any field within the MAC frame.

In one embodiment of this invention for application to IEEE Std 802.1 ah networks the index can be composed of any fields of the IEEE Std 802.1ah I-TAG. FIG. 3 shows one possible arrangement of the tables which could be used to support the SDAFPE and SSAFPE operation in an otherwise standard IEEE 802.1ah network. The requirements on the summarized MAC address index are the index must be composed of items available in MAC frames processed by the SDAFPE and SSAFPE and given the summarized MAC address index it must be possible to find a unique summarized MAC address. In this example the B-MAC addresses listed in the B-MAC tables are being summarized by the SMA S1 contained in the SMA Table.

In this example the SSAFPE and SDAFPE are located as is FIG. 1 where 120 and 110 are IEEE 802.1ah PBBNs and where the NNI is a modified IEEE•802.1ah peer NNI. Both the SSAFPE and the SDAFPE are located in the B-Component which services the peer NNI.

As frames pass from 120 to 110 they move though the SSAFPE. For each frame the SSAFPE inspects the SA to see if it matches a B-MAC in an of its B-MAC tables, as shown in FIG. 3. If the SSAFPE finds a matching table entry it looks up the SMA associated with the B-MAC Table where the B-MAC was matched by locating the SMA Table entry associated with the B-MAC Table. Once the SSAFPE has resolved an SMA it replaces the B-MAC with the SMA in the frame's SA and passes outputs the frame.

As frames pass from 110 to 120 they move through the SDAFPE. For each frame the SDAFPE inspects the DA to see if it matches a SMA in the SMA Table 350 shown in FIG. 3. If the SDAFPE finds a matching SMA entry it decodes the I-TAG extracting the I-PCP, I-SID and destination C-MAC. The SDAFPE then searches the tables of FIG. 3 to locate a summarized B-MAC located in the B-MAC Tables 340, 341, etc. To search the tables the SDAFPE executes the following steps: 1) search the I-PCP table 310 for a I-PCP matching the I-PCP of the frame and use the table entry to find an associated I-SID table among 320, 321, etc., this is an optional step which may be omitted if only a single I-SID table exists; 2) search the I-SID table for an I-SID which matches the I-SID extracted from the frame and use this information to locate a C-MAC table among 330-332 or an entry in a B-MAC table among 340, 341, etc., this is an optional step which may be omitted if only a single C-MAC table exists and if no I-SID table entries reference B-MACs directly; 3) search the C-MAC table if the I-SID table referenced a C-MAC table for a MAC matching the destination C-MAC of the frame and use the SC-MAC table entry to locate an entry in a B-MAC table.

In another embodiment for 802.1 bridged networks 120 is any bridged network and 110 is another bridged network. The NNI is simply a link between these bridged network which has a SSAFPE and SDAFPE instance pair. The algorithm used by the SSAFPE to transform MA SAs to MSA SAs is to replace all SAs of frames passing through it with a single SMA. The algorithm used by the SDAFPE to transform SMA DAs to MA DAs is: 1) if the frame DA is not the SMA used by the associated SSAFPE then the SDAFPE does nothing; 2) if the frame DA is the SMA used by the associated SSAFPE then the SDAFPE extracts a specified field from the frame and looks up this field in an index to a MA table; 3) if a match exists in the index the SDAFPE uses the match to locate the associated MA and replaces DA of the frame with the MA.

The necessary elements are:
a Summary MAC Address (SMA) which is used to identify an aggregate of summarized MAC addresses and is carried in the frame DA field;
a SDAFPE which transforms SMA DAs to MA DAs
Optionally
a SMA which is used to identify an aggregate of summarized MAC addresses may be carried in the frame SA field;
a SSAFPE which transforms MA SAs to MSA SAs
for application to IEEE 802.1ah networks a SDAFPE and SSAFPE may use tables of summarized B-MAC addresses indexed by fields of an IEEE Std 802.1ah I-TAG to transform summary MAC address to and from summarized MAC addresses;
a SDAFPE and SSAFPE may be used as part of a B-Component in an otherwise standard IEEE Std. 802.1ah to perform address summarization over an otherwise standard IEEE Std. 802.1ah peer NNI.

What is claimed is:

1. A method for aggregating backbone media access control addresses exchanged between two backbone networks over a peer interconnect by using a summary media access control address(es) (SMA) to represent a group or collection of backbone media access control addresses (MA), the method comprising:
receiving an IEEE 802.10 frame containing a backbone destination media access control address and one or more IEEE 802.10 tag(s) at an intermediate network device from the second of two backbone networks communicatively coupled by the intermediate network device;
inspecting the frame backbone destination media access control address and determining if it is a recognized summary media access control address, the backbone destination media access control address being an SMA for a plurality of intermediate network devices within the first of the two backbone networks;
if the previous step recognized the summary media access control address, then an IEEE 802.10 tag from the received frame is used to determine if the backbone destination is a known backbone destination and to determine the backbone destination media access control address;
overwriting the frame backbone destination media access control address with the known backbone destination media access control address determined in the previous step if the previous two steps determined the frame destination media access control address is a recognized summary media access control address and the backbone destination is known;
forwarding the frame received from the second of the two backbone networks communicatively coupled by the intermediate network device to the known backbone destination media access control address within the first backbone network;
where the frame contains an IEEE 802.1ah I-TAG which is used to determine the MA for frames having SMAs in the backbone destination fields.

2. A method as in 1 where a summary media access control address is used in the backbone destination and backbone source field of IEEE 802.1Q frames which contain a backbone destination media access control address, a backbone source media access control address, and one or more IEEE 802 tags, the method as in 1 further comprising:
receiving a frame containing a backbone source media access control address and one or more IEEE 802.1Q tag(s) at an intermediate network device from the first of two backbone networks communicatively coupled by the intermediate network device;
inspecting the frame backbone source media access control address and determining if the backbone source media access control address is to be aggregated using a summary media access control address and if it is identifying the summary media access control address representing the aggregate;
storing the backbone source media access control address using information contained in an IEEE 802.1Q tag;
overwriting the frame backbone source media access control address with the summary media access control address determined in a previous step if the previous step determined the frame backbone source media access control address should be overwritten with a summary media access control address;
forwarding the frame received from the first of the two backbone networks communicatively coupled by the intermediate network device to the second backbone network.

3. A method as in 2 where the frame contains an 802.1ah I-TAG which is used to store the MA for frames having SMAs in the backbone source fields.

* * * * *